Patented Nov. 8, 1949

2,487,114

UNITED STATES PATENT OFFICE 2,487,114

PROCESS FOR PRODUCING ACETYLATABLE CELLULOSE FROM STRAW

Henry Dreyfus, deceased, late of London, England, by Claude Bonard, administrator, London, England, assignor to Celanese Corporation of America, a corporation of Delaware No Drawing. Application October 3, 1945, Serial No. 620,181. In Great Britain March 16, 1944

6 Claims. (Cl. 92—13)

This invention relates to the production of cellulose from lignocellulosic materials, and especially from straw.

Although straw resembles wood in consisting mainly of cellulose, hemicelluloses (mainly pentosans), and lignin, the production of relatively pure cellulose from straw presents difficulties which are not encountered when cellulose of a similar standard of purity is made from most woods. For instance, cellulose obtained from wood by the usual methods (e. g. by the sulphite and soda processes), usually contains about 5% of hemicelluloses, and this figure can easily be reduced to 1% or less by treatment with alkali. On the other hand cellulose obtained from straw by similar methods may contain anything up to 30% of hemicelluloses, and the reduction of this figure even to 2–3% is far from easy. Another problem is presented by the high proportion of silica, usually about 4–5%, contained in straw, since silica is one of the most difficult of all inorganic substances to remove from lignocellulosic materials. Furthermore, cellulose obtained from straw frequency has a cuprammonium viscosity which is for many purposes unduly low.

The present invention aims at providing a method for obtaining from straw a cellulose which contains relatively small proportions of hemicelluloses and other impurities, which has a good cuprammonium viscosity, and which is suitable for conversion into cellulose acetate and other organic derivatives of cellulose.

According to the present invention lignocellulosic materials, and especially straw, are treated with hydrogen peroxide in an aqueous solution of an alkali. This operation is for the sake of brevity referred to below as "the oxidation," since it involves oxidation of the lignin and perhaps some other components of the materials. When followed by a simple bleaching operation it gives rise to a crude cellulose which is already nearly or quite free from lignin, although it still contains a considerable proportion of hemicelluloses. These hemicelluloses however can for the most part be removed by appropriate purification treatments which are described below, and a product is then obtained which has a high alpha-cellulose content, a low hemicellulose content, a low silica content, and good cuprammonium viscosity.

Before being subjected to the process of the present invention, straw is preferably broken up into small pieces, for example by chopping, and the chopped straw may with advantage be sieved so as to remove fine particles and dust, which are found to have a disproportionately large content of mineral matter, including silica.

Although the straw can be subjected to the oxidation with the hydrogen peroxide without any pretreatment, a much purer cellulose is obtained and the consumption of hydrogen peroxide is decreased if the straw is first heated with a dilute alkali solution or even with water. For this pretreatment, which removes certain loosely bound gummy materials as well as a considerable proportion of the silica and other inorganic constituents of the straw, it is preferable to use an alkali metal hydroxide solution of concentration about ½–2%. Preferably the straw is heated in the alkali solution of about 115°–125° C., but quite good results are obtained by boiling the solution under atmospheric pressure. It is not necessary to make use of a fresh alkali solution for this pretreatment; alkali which has already been used to purify cellulose, for example alkali which has been used to purify the crude product resulting from the oxidation, and which contains in solution hemicellulosic substances, may be used after any necessary adjustment of the concentration. After the pretreatment the straw is separated from the pretreating solution, washed with cold or warm water, and drained.

It has been found that this pretreatment, besides removing certain constituents of the straw, has an important softening effect, in that the harder parts of the straw, which are originally very resistant to attack either by mechanical or chemical agencies, lose much of their hardness, and are readily broken down by mechanical means to such an extent that they are efficiently attacked in the following chemical operations. The straw, after being removed from the pretreatment solution and washed, may therefore with advantage be passed while still wet through some form of disintegrating machine. It is not necessary to take any special measures to dry the straw after the pretreatment or disintegrating step, and it is thus immediately ready for the oxidation.

For this operation the straw is immersed in a dilute alkali solution, preferably a solution of an alkali metal hydroxide. The alkali solution may already contain the hydrogen peroxide required, but in order to prevent possible loss of hydrogen peroxide by premature decomposition it is preferable to add the hydrogen peroxide to the alkali solution after the straw has been introduced, and to ensure that the hydrogen peroxide is rapidly and uniformly distributed by stirring or otherwise thoroughly agitating the solution until all the hydrogen peroxide has been added. At this stage the alkali solution may be at room temperature or a lower temperature, or it may be already at the temperature to be employed for the oxidation or at some intermediate temperature.

The concentration of the dilute alkali solution in which the oxidation is performed may be between 0.25 and 5%, and especially between 0.5 and 2.5%. The amount of alkali solution needed depends to some extent on the concentration, and in general may be such that the amount of alkali (reckoned as sodium hydroxide) is between 7 and 20% of the weight of the original dry straw. It is, however, important to have sufficient liquor to prevent uneven attack on the straw, and usually the amount of liquor should not be much less than ten times the weight of the straw, whatever the concentration of the solution.

The amount of hydrogen peroxide employed, reckoned as 100% $H_2O_2$, may be between 5% and 25% of the weight of the original dry straw. Products having properties which are satisfactory for many purposes can be obtained using no more than 5-10% of hydrogen peroxide, but if the hemicellulose content of the products (after a purification treatment as hereinafter described) is to be reduced to as low a value as possible, it is preferable to use more hydrogen peroxide, especially 15-20%. From 10 to 20% of hydrogen peroxide may advantageously be used.

Although the oxidation will take place at temperatures of the order of 20° C., it does so only slowly. In practice therefore higher temperatures are employed, usually temperatures between 30° and 65° C., and especially between 50° and 60° C. Thus at temperatures of 55°-60° C. the oxidation usually needs only 3-4 hours, while at 40°-45° C. about 6 hours are required. The oxidation may be regarded as complete when the concentration of hydrogen peroxide in the solution has fallen below 0.04%, and when this point has been reached the solution is preferably heated for a short time, e. g. for 30-60 minutes, to its boiling point under atmospheric or a higher pressure, in order to bring into solution as high a proportion as practicable of the non-cellulosic constituents of the materials. The solid product, which may now be regarded as crude cellulose, is then separated from the solution, for example by decantation or filtration, and washed, preferably until it is free from alkali.

The oxidation may be carried out in a single stage or in two or more stages, each carried out under the conditions set out above except that the total amount of hydrogen peroxide employed in both or all the stages preferably falls within the range already given. The main effects of carrying out the oxidation in two stages are to decrease the hemicellulose content of the final purified cellulose and also slightly to decrease the yield of purified cellulose. Any advantage that may result from the use of more than two stages is not as a rule commensurate with the extra trouble and expense involved.

Both stages of a two stage process may be carried out under the same conditions, but preferably the conditions are somewhat milder in the second stage than in the first. Thus it is advantageous to use more than half the hydrogen peroxide, usually about two thirds of the total quantity employed, in the first stage. Furthermore the concentration of the alkali solution may be higher in the first than in the second stage. Advantageously in the first stage the concentration of the alkali solution is above 2%, especially between 2 and 3%, and in the second stage it is between 0.5 and 1.5%. In both stages the temperature is preferably between about 50° and 60° C. until the hydrogen peroxide concentration has fallen below 0.04%, and is then raised to the boiling point of the solution under atmospheric or a higher pressure. After each stage the solid products are separated and well washed.

The oxidation process may be modified by employing an aqueous solution of sodium or another alkali metal peroxide in place of the hydrogen peroxide and alkali solution. For example sodium peroxide may be dissolved in water at a temperature below 5° C., the pretreated straw introduced, and the solution rapidly brought to the reaction temperature. The amount of the alkali metal peroxide used should be at least equivalent in oxygen content to the amount of hydrogen peroxide employed in the process described above, and may exceed this amount. The other reaction conditions may be the same as when hydrogen peroxide is used in an alkali solution, and the oxidation may be carried out in a single stage or in two or more stages.

The crude cellulose obtained after the oxidation still contains a considerable amount of non-cellulosic impurities, mainly pentosans and other hemicelluloses, and is therefore usually subjected to further treatment for the removal of these substances. Such further treatment may with advantage comprise two or more treatments with alkali solutions under varying conditions, and at least one bleaching operation. Preferably the crude cellulose resulting from the oxidation is first bleached, for example with a chlorinating agent such as a hypochlorite. Thus the cellulose may be immersed in an aqueous solution of calcium hypochlorite at 20-25° C. until absorption of chlorine by the cellulose ceases, and may then be thoroughly washed and partially dried in readiness for the alkali treatment. This preferably consists of at least the following two operations. First the cellulose is treated in the cold with a fairly concentrated alkali solution such as is used for mercerising cotton; for instance the cellulose may be treated for one or two hours with a 10-15% sodium hydroxide solution in amount 5-12 times the weight of the partially dried cellulose, the solution being stirred or otherwise agitated throughout. At the end of this period the cellulose is separated from the alkali solution and thoroughly washed. The second operation is a boil with a dilute alkali solution under atmospheric pressure; for example the cellulose may be boiled with ten to twenty times its weight of a 0.4-0.8% sodium hydroxide solution for an hour, and may then again be washed free from alkali. After these treatments the cellulose may with advantage be given a final bleach with a very dilute calcium hypochlorite or equivalent solution.

This two-stage alkali treatment may be modified in various ways, especially by introducing further treatments with alkali or acid between the main bleaching operation and the treatment with the "mercerising" alkali solution. For example, the bleach may be followed by successive treatments with a cold alkali solution of concentration about 6% and with boiling (e. g. 0.4-0.8%) alkali, or by successive treatments with the cold 6% alkali and a hot dilute acid, for example hydrochloric acid of concentration in the neighborhood of 0.5%. In another modification the bleach may be followed immediately (after the cellulose has been washed) by a boil with dilute hydrochloric acid, and the cellulose then treated with the "mercerising" alkali. In all cases after each operation the cellulose should be washed until it is substantially free from the alkaline or acid reagent or bleaching agent.

As has already been indicated, the process described above is of particular value in the production of cellulose from straw. It may, however, also be applied to the production of cellulose from other lignocellulosic materials, for example from deciduous and coniferous woods (especially after part of the lignin has been removed, e. g. by a suitable treatment with alkali) and from grasses, bamboo and the like. The cellulose produced from straw or other materials by the new process is suitable for conversion into cellulose esters, e. g. cellulose acetate, and cellulose ethers, and also for the production of viscose and for paper-making and like purposes. When it is to be used for the production of cellulose esters of organic acids it may first be subjected to a treatment with an acid, preferably acetic or formic acid. The following examples illustrate the invention:

Example 1

100 parts of chopped straw, which had been sieved free from dust, was treated for 1 hour with 1,000 parts of 2% sodium hydroxide solution at 120° C., and was then washed free from alkali, drained, and mechanically disintegrated. The product was then immersed in 1,500 parts of 1% sodium hydroxide solution at room temperature, to which 15 parts of hydrogen peroxide (reckoned as 100% $H_2O_2$) was added. The temperature of the solution was then raised to 50°–60° C., and kept at this value until a test showed that the concentration of hydrogen peroxide in the solution had fallen below 0.04%, when the solution was boiled for 15–20 minutes, and the crude cellulose filtered off and washed.

The crude cellulose was bleached with calcium hypochlorite at about 20° C., and the bleached product agitated for about an hour with 12% sodium hydroxide solution at 20° C., filtered off and washed; the cellulose was then boiled with 0.5% sodium hydroxide solution for an hour, filtered off and washed, and given a final bleach with a cold very dilute calcium hypochlorite solution.

Example 2

100 parts of chopped and sieved straw was heated to 120° C. for 1 hour with 2% sodium hydroxide solution, and was washed, drained, and mechanically disintegrated. It was then immersed in 1,000 parts of 2½% sodium hydroxide solution at about 55° C.; 10 parts of hydrogen peroxide was added, and the solution was kept at 55°–60° C. until the concentration of the hydrogen peroxide had fallen below 0.04%. The solution was boiled for 20 minutes and the solid product was filtered off and washed. It was then immersed in 1,000 parts of 1% sodium hydroxide solution at about 55° C.; 5 parts of hydrogen peroxide was added, and the temperature again kept at 55°–60° C. until the hydrogen peroxide concentration had fallen below 0.04%. The solution was then boiled for 20 minutes, and the resulting crude cellulose filtered off, washed, and purified as described in Example 1.

Example 3

This example shows the effect of using only a small proportion of hydrogen peroxide.

100 parts of chopped and sieved straw was heated to 120° C. with 1,000 parts of 2% sodium hydroxide solution, and was then freed from alkali and drained. It was then heated to 55°–60° C. with 5 parts of hydrogen peroxide in 1,500 parts of 1% sodium hydroxide solution until the concentration of hydrogen peroxide in the solution had fallen below 0.04%, when the temperature was raised to the boiling point for 20 minutes. The resulting crude cellulose was filtered off, washed, bleached with calcium hypochlorite and purified by successive treatments with cold 6% alkali, boiling 0.5% alkali, cold 12% alkali, boiling 0.5% alkali, and a cold very dilute calcium hypochlorite solution. In spite of the additional purification steps, the cellulose produced had a slightly higher hemicellulose content than the product of Example 1, but the yield of cellulose was also slightly higher.

In any of these examples the pretreatment could have been carried out under atmospheric pressure; both the hemicellulose content and the yield of the purified product would then have been slightly higher.

In all the examples the proportions are given in parts by weight.

Having described the invention, what is desired to be secured by Letters Patent is:

1. Process for the production from straw of cellulose suitable for acetylation, which comprises giving the straw a pre-treatment with a dilute solution of sodium hydroxide at 100°–125° C., mechanically disintegrating the pre-treated straw and subjecting the pre-treated and disintegrated straw at 50°–60° C. in two stages to the action of an aqueous solution resulting from mixing 10%–20% of hydrogen peroxide and 7%–20% of sodium hydroxide, both in aqueous solution (both proportions being calculated on the dry weight of the straw before the pre-treatment), the concentration of alkali (reckoned as sodium hydroxide) being between 0.5% and 2.5%.

2. Process for the production from straw of cellulose suitable for acetylation, which comprises giving the straw a pre-treatment with a dilute solution of sodium hydroxide at 100°–125° C. and subjecting the pre-treated straw at 30°–65° C. in two stages to the action of a solution resulting from mixing aqueous hydrogen peroxide and aqueous sodium hydroxide, the alkali concentration of the solution (reckoned as sodium hydroxide) being 0.25%–5% and the total amount of hydrogen peroxide and sodium hydroxide employed in the two stages being 5%–25% and 7%–20% respectively, both proportions being calculated on the dry weight of the straw before the pre-treatment.

3. Process according to claim 2, wherein in the first stage two-thirds of the total amount of hydrogen peroxide is used and the alkali concentration (reckoned as sodium hydroxide) of the solution is 2%–3%, and in the second stage one-third of the total amount of hydrogen peroxide is used and the alkali concentration (reckoned as sodium hydroxide) is 0.5%–1.5%.

4. Process for the production from straw of cellulose suitable for acetylation, which comprises giving the straw a pre-treatment with a dilute solution of sodium hydroxide at 100°–125° C., mechanically disintegrating the pre-treated straw and subjecting the pre-treated and disintegrated straw at 30°–65° C. in two stages to the action of a solution resulting from mixing aqueous hydrogen peroxide and aqueous sodium hydroxide, the alkali concentration of the solution (reckoned as sodium hydroxide) being 0.25%–5% and the total amount of hydrogen peroxide and sodium hydroxide employed in the two stages being 5%–25% and 7%–20% respectively, both proportions being calculated on the dry weight of the straw before pre-treatment.

5. Process according to claim 4, wherein in the first stage two thirds of the total amount of hydrogen peroxide is used in an aqueous sodium hydroxide solution of concentration 2 to 3% and in the second stage one third of the total amount of hydrogen peroxide is used in an aqueous sodium hydroxide solution of concentration 0.5 to 1.5%.

6. Process according to claim 4 wherein the total amount of hydrogen peroxide employed in the two stages is 15%.

CLAUDE BONARD,
*Administrator of the Estate of the said Henry Dreyfus, Deceased.*

REFERENCES CITED

The following references are of record in the file of this patent:

UNITED STATES PATENTS

| Number | Name | Date |
|---|---|---|
| 1,932,904 | McKee | Oct. 31, 1933 |

FOREIGN PATENTS

| Number | Country | Date |
|---|---|---|
| 518,664 | France | May 28, 1921 |
| 540,571 | France | July 13, 1922 |
| 395,876 | Germany | May 24, 1924 |
| 238,305 | Great Britain | Aug. 17, 1925 |
| 555,985 | Great Britain | Sept. 15, 1943 |